(12) United States Patent
Park (10) Patent No.: US 11,262,259 B2
(45) Date of Patent: Mar. 1, 2022

(54) TORQUE SENSOR MODULE FOR STEERING DEVICE

(71) Applicant: HYUNDAI MOBIS CO., LTD., Seoul (KR)

(72) Inventor: Keum Hyeon Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 54 days.

(21) Appl. No.: 16/788,238

(22) Filed: Feb. 11, 2020

(65) Prior Publication Data

US 2020/0264062 A1 Aug. 20, 2020

(30) Foreign Application Priority Data

Feb. 15, 2019 (KR) .................. 10-2019-0017671

(51) Int. Cl.
*G01L 5/22* (2006.01)
*B62D 6/10* (2006.01)
*G01D 5/14* (2006.01)

(52) U.S. Cl.
CPC .............. *G01L 5/221* (2013.01); *B62D 6/10* (2013.01); *G01D 5/145* (2013.01)

(58) Field of Classification Search
CPC .......... G01L 5/221; G01D 5/145; B62D 6/10; B62D 5/0463

USPC ...................................... 73/862.08
See application file for complete search history.

(56) References Cited

U.S. PATENT DOCUMENTS

| | | | |
|---|---|---|---|
| 7,677,114 B2* | 3/2010 | Deshmukh | G01L 3/104 73/862.328 |
| 8,810,237 B2* | 8/2014 | Muto | G01D 5/145 324/207.2 |
| 9,821,846 B2* | 11/2017 | Schoepe | B62D 6/10 |
| 10,739,215 B2* | 8/2020 | Lee | G01L 5/22 |
| 2009/0224500 A1* | 9/2009 | Raschke | G01D 5/04 280/93.5 |
| 2010/0295498 A1* | 11/2010 | Tominaga | B62D 5/0406 318/689 |
| 2017/0315004 A1* | 11/2017 | Toyama | G01R 33/0011 |
| 2017/0350776 A1* | 12/2017 | Woo | B62D 15/021 |
| 2018/0120182 A1* | 5/2018 | Hur | G01D 5/145 |

* cited by examiner

*Primary Examiner* — Octavia Hollington
(74) *Attorney, Agent, or Firm* — H.C. Park & Associates, PLC (57) ABSTRACT

A torque sensor module for a steering device may include: a stator fixed to a designated position of a steering shaft and configured to detect a steering angle; a rotor rotatably fixed in the stator; a signal transmitter configured to transmit torsion information between the stator and the rotor to a Hall effect IC sensor (Hall IC); a printed circuit board having the signal transmitter and the Hall IC mounted thereon; and an ECU (Electronic Control Unit) of an EPS (Electronic Power Steering), mounted on the printed circuit board.

13 Claims, 7 Drawing Sheets

Magnetic field intensity change rate table (C)
- excluding magnetic field intensity by torque sensor

| Current | 0 | 1 | 2 | 3 | ... | 10 | ... | Max |
|---|---|---|---|---|---|---|---|---|
| Magnetic field intensity change rate | | | | | | | | |

TORQUE SENSOR MODULE FOR STEERING DEVICE

CROSS-REFERENCE TO RELATED APPLICATION

This application claims priority from and the benefit of Korean Patent Application No. 10-2019-0017671 filed on Feb. 15, 2019 in the Korean Intellectual Property Office, which is hereby incorporated by reference for all purposes as if set forth herein.

BACKGROUND

Field

Exemplary embodiments relate to a torque sensor module for a steering device, and more particularly, to a torque sensor module for a steering device, which is configured as an integrated module for a steering device, in which an ECU (Electronic Control Unit) and a torque sensor are integrated on one printed circuit board in a housing, and can prevent an occurrence of torque sensing error by introduction of an external magnetic field.

Discussion of the Background

Figure 1:
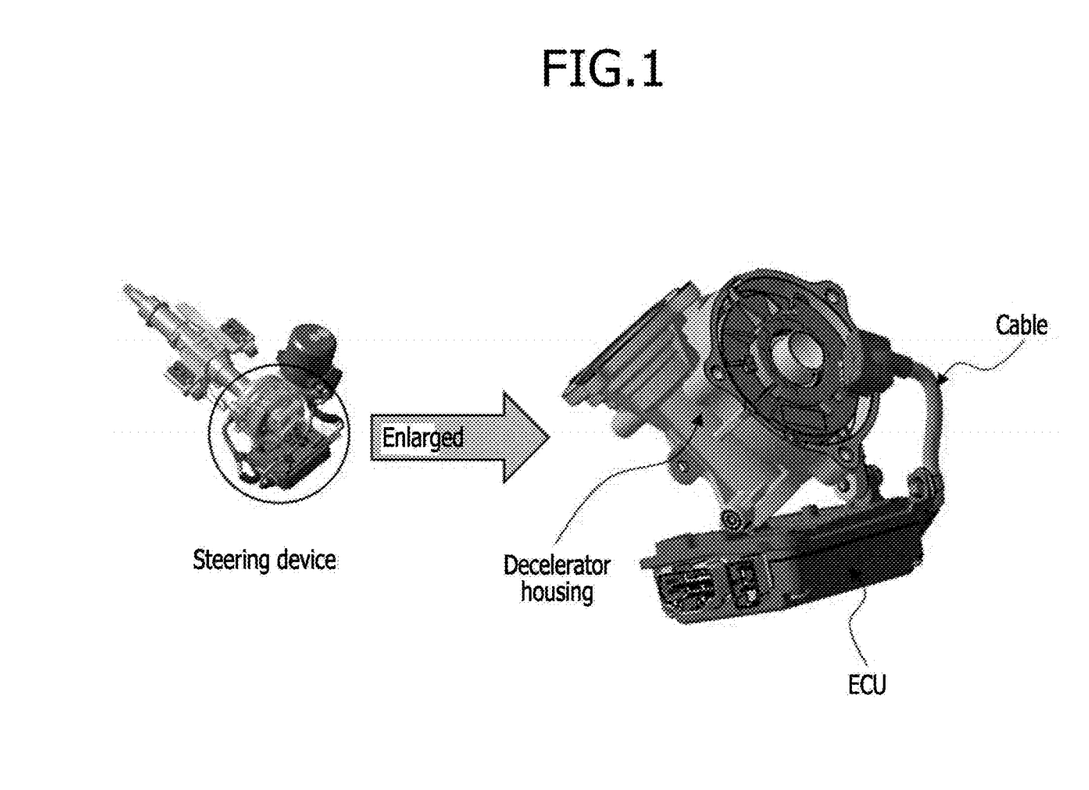
FIG. 1 is a diagram illustrating a connection structure of an ECU (Electronic Control Unit) in a steering device according to the related art.

In general, a vehicle has an EPS (Electronic Power Steering) which enables a driver to easily operate a steering wheel, as illustrated in FIG. 1. The EPS assists the driver's steering force using a rotational force of a motor.

The EPS includes an ECU (Electronic Control Unit) configured to control an operation of the motor when the steering wheel is operated. The ECU receives signals from a steering angle sensor, a torque sensor, a vehicle speed sensor, an engine RPM sensor and the like, calculates a current value using the received signals, and provides the calculated current value to the motor to adjust a steering feel of the steering wheel.

Thus, the ECU provides a relatively light steering feel by increasing the current value in a low-speed section, and provides a relatively heavy steering feel by decreasing the current value in a high-speed section, such that the driver can drive safely.

Among the sensors that provide information to the ECU, the torque sensor may have an offset at which predetermined torque is continuously generated by an external factor such as the geometry of a suspension or vehicle. The offset of the torque sensor may cause a left/right difference in steering force or restoring force of the steering device, thereby making the driver have a sense of difference.

In the related art, however, since the ECU is disposed outside the steering device, the vehicle includes a cable (external cable) for transferring a signal (sensing signal) of the torque sensor, embedded in a decelerator housing, to the ECU. Therefore, there is a need for measures for preventing damage to the external cable and interference with surrounding parts.

Furthermore, in the related art, there is a need for a design for securing robustness in consideration of introduction of surging electricity from the outside, when the external cable is damaged, and the external cable and the ECU are disposed to protrude to the outside, thereby making it difficult to secure a gap from the surrounding parts. Furthermore, since no measures for an external magnetic field are reflected, a torque offset error may be caused by the external magnetic field.

The above information disclosed in this Background section is only for enhancement of understanding of the background of the invention and, therefore, it may contain information that does not constitute prior art.

SUMMARY

Various embodiments are directed to a torque sensor module for a steering device, which is configured as an integrated module for a steering device, in which an ECU (Electronic Control Unit) and a torque sensor are integrated on one printed circuit board in a housing, and can prevent an occurrence of torque sensing error by introduction of an external magnetic field.

Additional features of the invention will be set forth in the description which follows, and in part will be apparent from the description, or may be learned by practice of the invention.

In an embodiment, a torque sensor module for a steering device may include: a stator fixed to a designated position of a steering shaft and configured to detect a steering angle; a rotor rotatably fixed in the stator; a signal transmitter configured to transmit torsion information between the stator and the rotor to a Hall effect IC sensor (Hall IC); a printed circuit board having the signal transmitter and the Hall IC mounted thereon; and an ECU of an EPS (Electronic Power Steering), mounted on the printed circuit board.

The printed circuit board may have a hole through which the steering shaft is installed, and the hole may have a larger circumference than the circumference of the stator.

The torque sensor module may further include a housing in which the signal transmitter, the Hall IC and the ECU, integrated and mounted on the printed circuit board, the stator and the rotor are integrated and included.

When the signal transmitter mounted on the printed circuit board is integrated and included in the housing, an end of the signal transmitter may be formed at a height corresponding to an upper end of the stator.

The printed circuit board may further include a high current system circuit configured to input power to the ECU.

The printed circuit board may further include an electromagnetic field shielding unit between the high current system circuit and the hole through which the steering shaft is installed. The electromagnetic field shielding unit may be formed in a round shape to surround the circumference of the stator.

The electromagnetic field shielding unit may be formed on both of top and bottom surfaces of the printed circuit board.

The electromagnetic field shielding unit may be formed of a conductive material and directly connected to the printed circuit board or a chassis ground.

In an embodiment, a torque sensor module for a steering device may include: a torque sensing unit configured to sense torsion of a steering shaft and output a signal corresponding to the sensed torsion; and a control unit configured to calibrate the signal sensed by the torque sensing unit and output an optimized signal corresponding to an error caused by an external magnetic field. The torque sensing unit may include: a stator fixed to a designated position of a steering shaft and configured to detect a steering angle; a rotor rotatably fixed in the stator; and a signal transmitter configured to transmit torsion information between the stator and the rotor to a Hall IC.

The torque sensor module may further include a storage unit configured to measure and store a magnetic field intensity change rate which occurs depending on a rotation angle of the shaft, with separate power applied instead of power applied to an ECU integrated with the torque sensor module, such that the magnetic field intensity change rate is used as a reference value during calibration of the torque sensor module.

The magnetic field intensity change rate may be converted into a corresponding voltage and then stored.

In order to calibrate the signal sensed by the torque sensing unit, the control unit may check whether a torque offset occurs, when a steering wheel is at the zero position, and perform offset calibration to set the torque offset to 0 when the torque offset occurred.

When the steering wheel is initially operated by a driver, the control unit may include a magnetic field intensity change rate depending on a current, which is changed according to a change in steering angle by the steering and supplied to the ECU, to a previously-stored magnetic field intensity change rate stored as a reference value for calibration, and calibrate a torque offset value in response to a difference between the magnetic field intensity change rates.

The control unit may check the current steering angle when the vehicle is started up, check whether a torque offset occurs, by comparing a current torque value to a previously-stored torque reference value at the zero position, when the current steering angle corresponds to the zero position, optimize the performance of the torque sensor module by performing torque offset calibration when the torque offset occurred, check whether a magnetic field intensity change rate outputted from the torque sensor module is different from the previously-stored reference value, when the drivers performs steering with the performance of the torque sensor module optimized, and output a value obtained by calibrating a signal outputted from the torque sensor module as the output signal of the torque sensor module, when the magnetic field intensity change rate is different from the previously-stored reference value.

In accordance with the embodiments of the present disclosure, it is possible to provide the torque sensor module for a steering device, which is configured as an integrated module for a steering device, in which the ECU and the torque sensor are integrated on one printed circuit board in the housing, and can prevent an occurrence of torque sensing error by introduction of an external magnetic field.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements. Like reference numerals throughout the description denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Hereinafter, exemplary embodiments of the present invention will be described in more detail with reference to the accompanying drawings.

Figure 2:
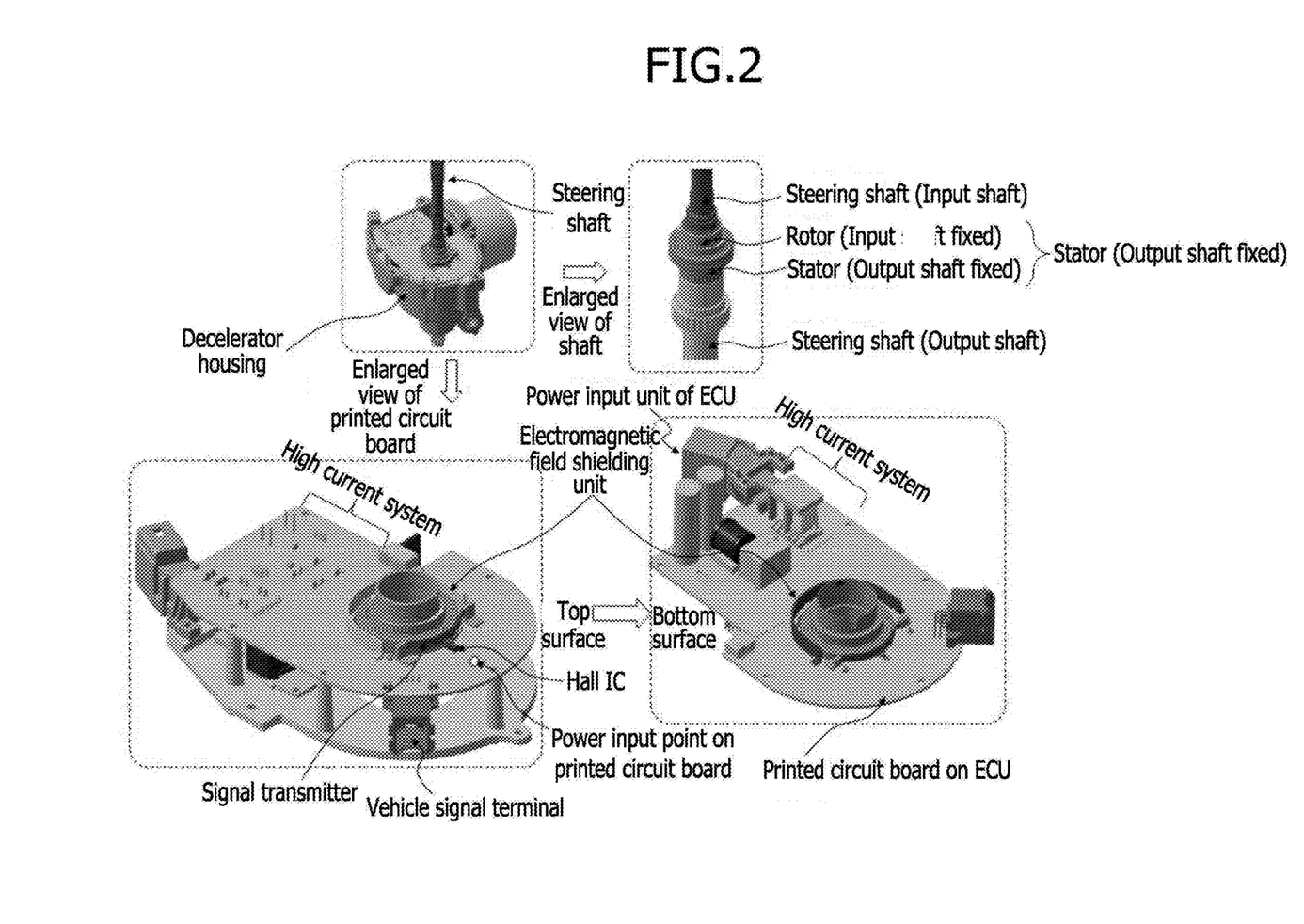
FIG. 2 is a diagram illustrating the shape of a torque sensor module for a steering device in accordance with an embodiment of the present disclosure, in which a torque sensor and an ECU are integrated on one printed circuit board, and embedded in a housing.

FIG. 2 is a diagram illustrating the shape of a torque sensor module for a steering device in accordance with an embodiment of the present disclosure, in which a torque sensor and an ECU (Electronic Control Unit) are integrated on one printed circuit board, and embedded in a housing.

As illustrated in FIG. 2, the torque sensor module for a steering device in accordance with the embodiment of the present disclosure has a structure in which an ECU of an EPS (Electronic Power Steering) is disposed in a decelerator housing, and a torque sensor electric device for sensing torsion of a steering shaft and converting the sensed torsion into an electrical signal, i.e. a Hall effect IC sensor (Hall IC), is disposed on the printed circuit board of the ECU so as to be integrated with the ECU.

More specifically, referring to FIG. 2, the torque sensor module for a steering device in accordance with the embodiment of the present disclosure includes a stator fixed to a designated position of the steering shaft to detect a steering angle, a rotor rotatably fixed in the stator, a signal transmitter configured to transmit torsion information between the stator and the rotor to the Hall IC, the printed circuit board having the signal transmitter and the Hall IC mounted thereon, and the ECU of the EPS mounted on the printed circuit board.

The printed circuit board has a hole through which the steering shaft is installed, and the hole has a larger circumference than the circumference of the stator.

The signal transmitter, the Hall IC and the ECU, which are mounted and integrated on the printed circuit board, and the stator and the rotor are integrated and included in the housing.

When the signal transmitter mounted on the printed circuit board is integrated and included in the housing, an end of the signal transmitter is formed at a height corresponding to an upper end of the stator.

The printed circuit board further includes a high current system circuit for inputting power to the ECU and an electromagnetic field shielding unit formed between the high current system circuit and the hole through which the steering shaft is installed. The electromagnetic field shielding unit is formed in a round shape to surround the circumference of the stator. At this time, the electromagnetic field shielding unit is formed in a semi-round shape to open the portion where the signal transmitter is formed.

The electromagnetic field shielding unit is formed on both of the top and bottom surfaces of the printed circuit board, made of a conductive material, and directly connected to the printed circuit board or a chassis ground.

Thus, in the torque sensor module in accordance with the present embodiment, a case for protecting the ECU according to the related art may be removed, a cable (or external cable) and a connector (i.e. a connector attached to either end of the cable) for connecting the two devices (i.e. the torque sensor electric device (Hall IC) and the ECU) may be removed, and a printed circuit board (not illustrated) of the torque sensor, which has been separately disposed in the related art, may be integrated with the printed circuit board of the ECU in order to remove an output terminal of the torque sensor. Furthermore, a housing used in the related art may be removed from the torque sensor for sensing torsions of an input shaft and an output shaft and converting the torsion angles into electrical signals, which makes it possible to simplify the structure.

The electromagnetic field shielding unit for preventing or reducing the influence of a magnetic field or electromagnetic field (electromagnetic energy generated by an electric field and a magnetic field) caused by a current flowing through the high current system for supplying power to the ECU is disposed on both of the front and rear (top and bottom) surfaces of the printed circuit board.

The electromagnetic field shielding unit is formed of a conductive material, and directly connected to the printed circuit board or the chassis ground. Thus, the electromagnetic field shielding unit absorbs the magnetic field (i.e. electromagnetic field) generated by the current flowing through the high current system and discharges the magnetic field to the outside. The electromagnetic field shielding unit may serve to block a magnetic field inputted from the outside.

The torque sensor module for a steering device in accordance with the present embodiment, illustrated in FIG. 2, can be applied to all types of torque sensors regardless of the sensing principles of the torque sensors, because the torque sensor electric device (i.e. Hall IC) and the printed circuit board of the ECU are integrated.

Figure 3:
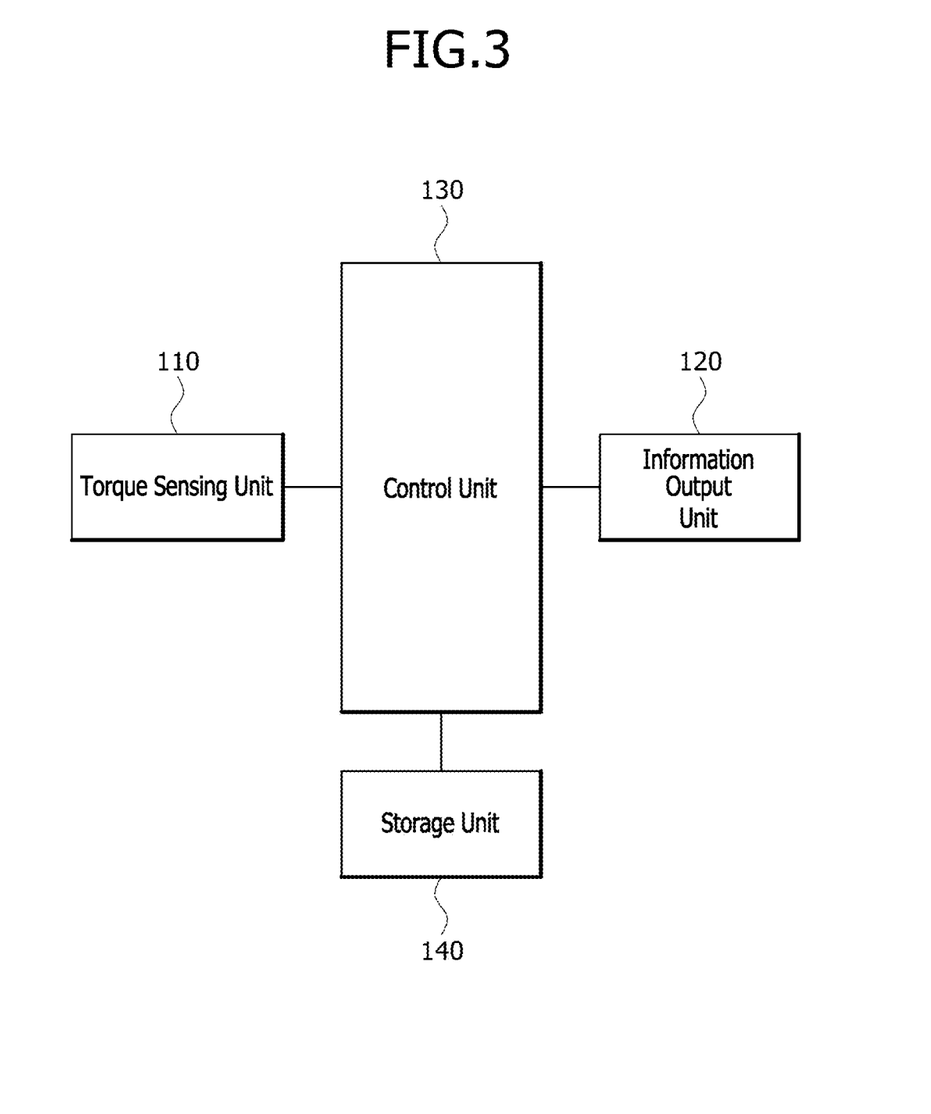
FIG. 3 is a diagram illustrating a schematic configuration of the torque sensor module for a steering device in accordance with the embodiment of the present disclosure.

FIG. 3 is a diagram illustrating a schematic configuration of the torque sensor module for a steering device in accordance with the embodiment of the present disclosure.

As illustrated in FIG. 3, the torque sensor module for a steering device in accordance with the present embodiment includes a torque sensing unit 110, a current detection unit 120, a control unit 130, a storage unit 140 and an information output unit 150.

The torque sensing unit 110 includes the torque sensor electric device (for example, Hall IC) configured to sense torsion of the steering shaft and output a signal corresponding to the sensed torsion, a torsion sensing unit (see FIG. 2) including the rotor and the stator, and the signal transmitter (see FIG. 2). That is, the torque sensor module in accordance with the present embodiment has a conceptual structure in which the rotor, the stator, the signal transmitter and the torque sensor electric device (for example, Hall IC) are integrated.

Therefore, when the torque sensor module is simply referred to as the torque sensor or the torque sensing unit 110 for convenience of description, it may substantially indicate the torque sensor module.

The control unit 130 calibrates a signal sensed by the torque sensing unit 110, and outputs the optimized signal. That is, the control unit 130 calibrates and outputs a signal (sensing signal) of the torque sensor module for optimizing the performance of the torque sensor module.

At this time, when generating a torque offset as a kind of reference value for signal calibration to optimize the performance of the torque sensor module, the control unit 130 uses separate power as input power for driving the torque sensor module, without using input power of the ECU.

For example, the control unit 130 may use separate power which is inputted through a spare terminal of vehicle signal terminals or a power input point on the print circuit board.

That is because, when the same power as the input power of the ECU is used during the signal calibration for optimizing the performance of the torque sensor module, an electromagnetic field generated by the ECU may introduce external noise into a signal outputted from the torque sensor module, and thus cause a signal error.

For example, when no torsion occurs in the steering shaft, an electromagnetic field may be introduced into a signal outputted from the torque sensor module or a signal obtained by converting an output signal of the torque sensor through an electrical signal conversion circuit, and then misrecognized as torsion. Furthermore, when normal torsion occurs in the steering shaft, an electromagnetic field may be introduced into a signal outputted from the torque sensor or a signal obtained by converting an output signal of the torque sensor through the electrical signal conversion circuit, and then recognized as torsion larger or smaller than the actual torsion.

The control unit 130 measures a magnetic field intensity change rate (Gauss/deg) which initially occurs according to the rotation angle of the shaft with the separate power applied, and stores the measured magnetic field intensity change rate in the storage unit 140, such that the magnetic field intensity change rate is used as a reference value during calibration.

At this time, the magnetic field intensity change rate may be converted into a voltage and then stored.

The control unit 130 checks a torque offset for calibration to optimize the performance of the torque sensor module.

For example, when a driver does not perform steering, no current flows through the ECU. Thus, no electromagnetic field is generated. Therefore, the control unit 130 checks a torque offset when the steering wheel is at the zero position.

The torque offset indicates a torque value corresponding to a torque sensor signal which is changed by the influence of an external magnetic field or a magnetic field generated by the high current system and then outputted, even though the torque value needs to be zero torque because no torque sensor signal is generated when the steering wheel is at the zero position (middle point).

The control unit 130 checks the steering angle at the zero position, and performs offset calibration to set the torque offset to 0, when the torque offset occurred. Then, the control unit 130 compares a current magnetic field intensity change rate to the magnetic field intensity change rate which has been initially stored as the reference value, during the initial steering after a start up. When a different value is inputted or an external electromagnetic field is introduced, the control unit 130 calculates the magnetic field intensity change rate by applying a magnetic field intensity change rate depending on the current of the ECU (see Table of FIG. 4), in order to perform offset calibration.

This operation may be rechecked and performed again when the EPS is turned on/off.

Figure 4:
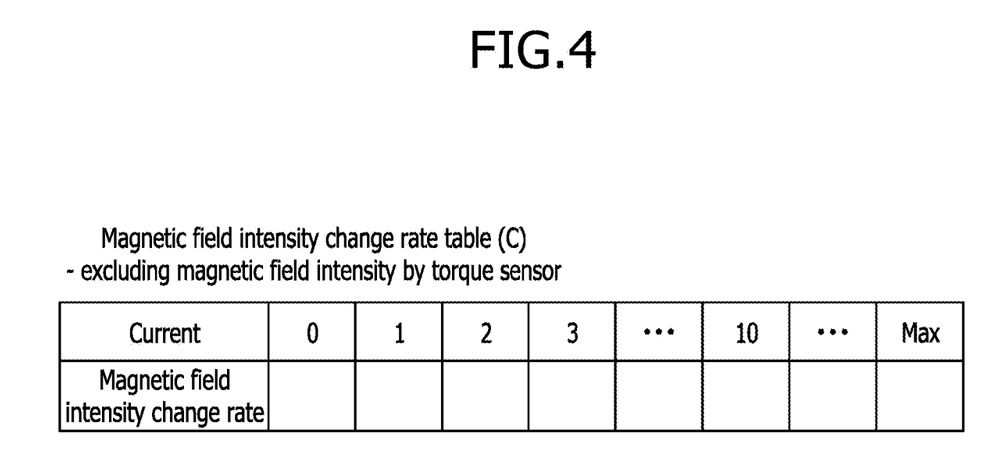
FIG. 4 is a table showing a magnetic field intensity change rate caused by a current flowing through a high current system for supplying power to the ECU in FIG. 3.
Figure 5:
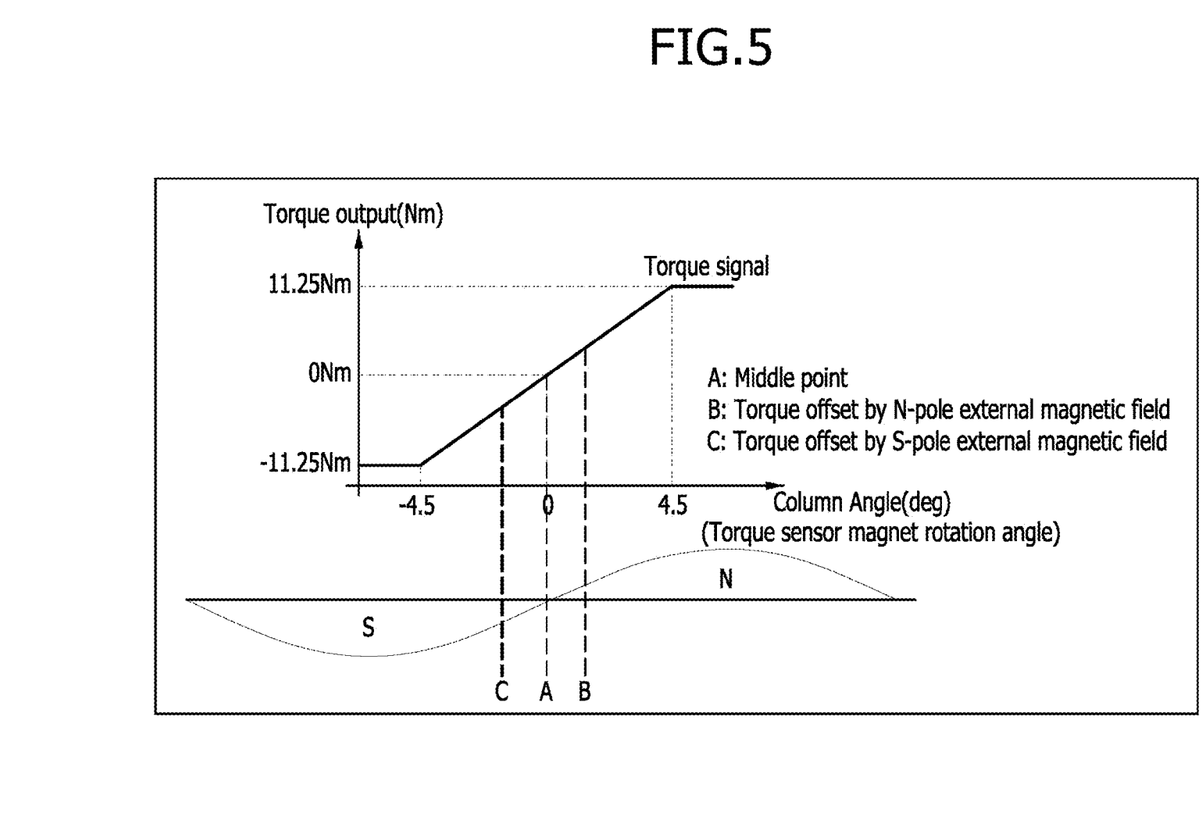
FIG. 5 is a diagram for describing that a torque offset is changed in response to a change in steering angle in FIG. 3.

FIG. 4 is a table showing a magnetic field intensity change rate depending on a current flowing through the high current system for supplying power to the ECU in FIG. 3, and FIG. 5 is a diagram for describing that a torque offset is changed in response to a change in steering angle in FIG. 3.

That is, the torque offset value is changed in response to a change in magnetic field intensity.

As a result, the current supplied to the ECU is changed according to a change in steering angle or rotation angle by a driver's steering, the magnetic field intensity is changed according to the current, and the torque offset value is also changed in response to the change in magnetic field intensity (see FIG. 5).

Therefore, the torque signal may be calibrated based on the magnetic field intensity change rate table depending on the current in FIG. 4.

When the output signal of the torque sensor module is calibrated, the control unit 130 outputs the value calibrated for performance optimization of the torque sensor module, i.e. the calibrated output signal of the torque sensor module, through the information output unit 150.

Figure 6:
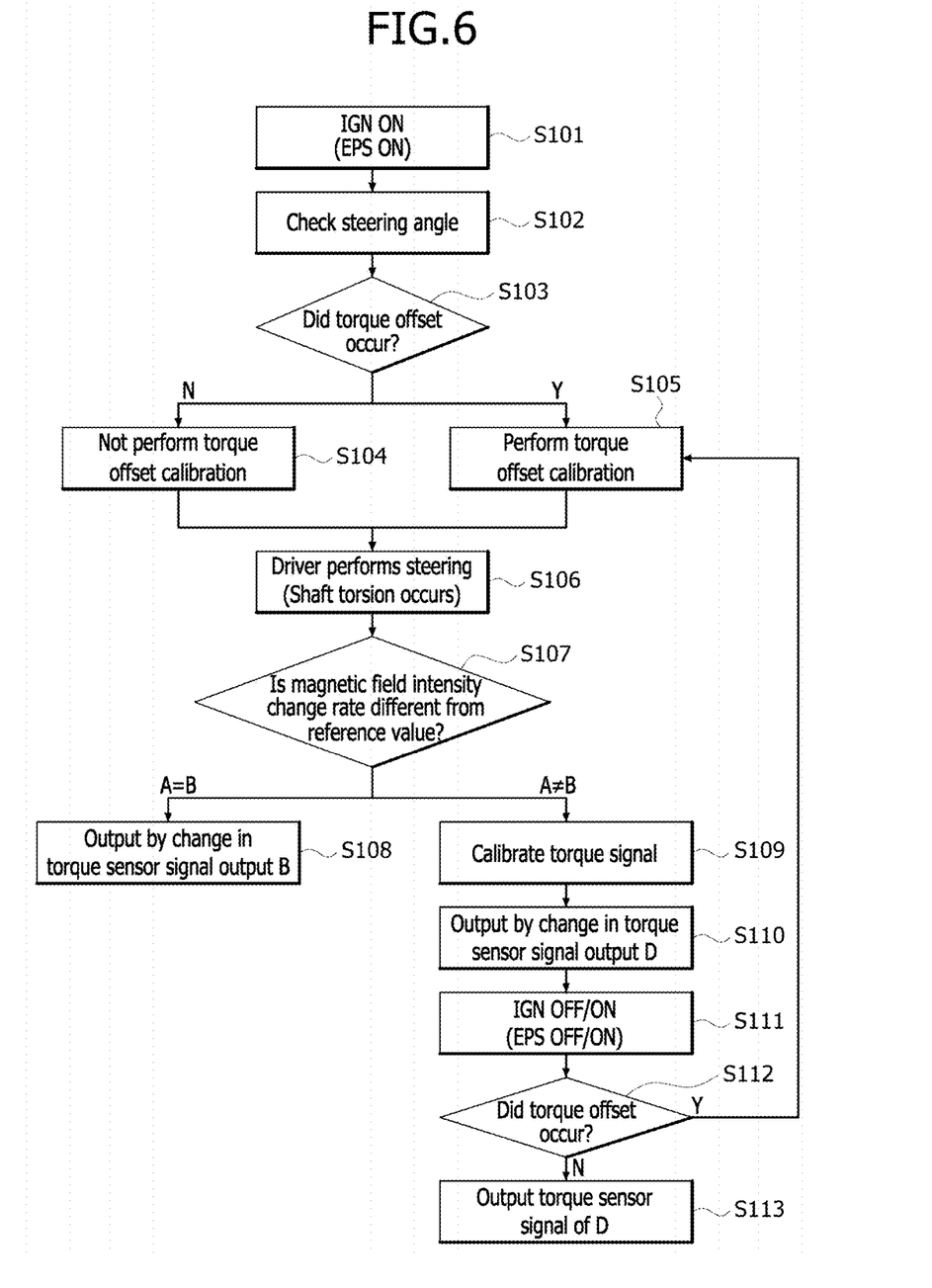
FIG. 6 is a flowchart illustrating a calibration method of a torque sensor module for a steering device in accordance with an embodiment of the present disclosure.

FIG. 6 is a flowchart for describing a calibration method of a torque sensor module for a steering device in accordance with an embodiment of the present disclosure.

Referring to FIG. 6, when the vehicle is started up (IGN ON or EPS ON) in step S101, the control unit 130 checks the current steering angle in step S102.

Thus, when the current steering angle corresponds to the zero position, the control unit 130 compares the current torque value to a previously-stored torque reference value A at the zero position, in order to check whether a torque offset occurred, in step S103.

When the check result of step S103 indicates that no torque offset occurred (No in step S103), the control unit 130 does not perform torque offset calibration in step S104. That is, although the torque offset calibration is not performed, the performance of the torque sensor is already optimized.

However, when the check result of step S103 indicates that a torque offset occurred (Yes in step S103), the control unit 130 performs torque offset calibration in step S105. That is, the control unit 130 performs torque offset calibration to optimize the performance of the torque sensor.

When the driver performs steering in step S106 after the performance of the torque sensor module is optimized, torsion of the shaft occurs. Then, a current applied to the ECU is changed in response to a change in steering angle (torsion) by the steering, and the intensity of a magnetic field is changed in response to the changed current.

Therefore, the control unit 130 checks whether a magnetic field intensity change rate B outputted from the torque sensor module is different from the reference value A stored in the storage unit 140 in advance (i.e. a magnetic field intensity change rate depending on the steering angle), in step S107.

When the check result of step S107 indicates that the magnetic field intensity change rate B outputted from the torque sensor module is equal to the reference value A stored in advance (i.e. the magnetic field intensity change rate depending on the steering angle) (A=B in step S107), the control unit 130 outputs an output signal by the magnetic field intensity change rate B outputted from the torque sensor module as it is, in step S108.

However, when the check result of step S107 indicates that the magnetic field intensity change rate B outputted from the torque sensor module is different from the reference value A stored in advance (i.e. the magnetic field intensity change rate depending on the steering angle) (A≠B in step S107), the control unit 130 outputs a value D obtained by calibrating a signal outputted from the torque sensor module, in step S109.

The value D obtained by calibrating the signal outputted from the torque sensor module is calculated through a process of reflecting a value into the magnetic field intensity change rate B outputted from the torque sensor module, the value being obtained by adding or subtracting the magnetic field intensity change rate C depending on the current, which is applied to the ECU, in response to the change in steering angle, i.e. torsion.

Therefore, the control unit 130 outputs the value D, obtained by calibrating the signal outputted from the torque sensor module, as the output signal of the torque sensor module in step S110.

Then, when the vehicle is started up again (IGN ON or EPS ON) in step S111, the control unit 130 checks the current steering angle to check whether a torque offset occurs, in step S112. When the check result of step S112 indicates that a torque offset occurred (Yes in step S112), the control unit 130 performs torque offset calibration in step S105. That is, the control unit 130 performs torque offset calibration to optimize the performance of the torque sensor.

When the check result of step S112 indicates that no torque offset occurred (No in step S112), the control unit 130 outputs the value D obtained by calibrating the signal outputted from the torque sensor module in step S113. However, steps S111 to S113 may be substituted by repeating step S101 to S110.

Figure 7:
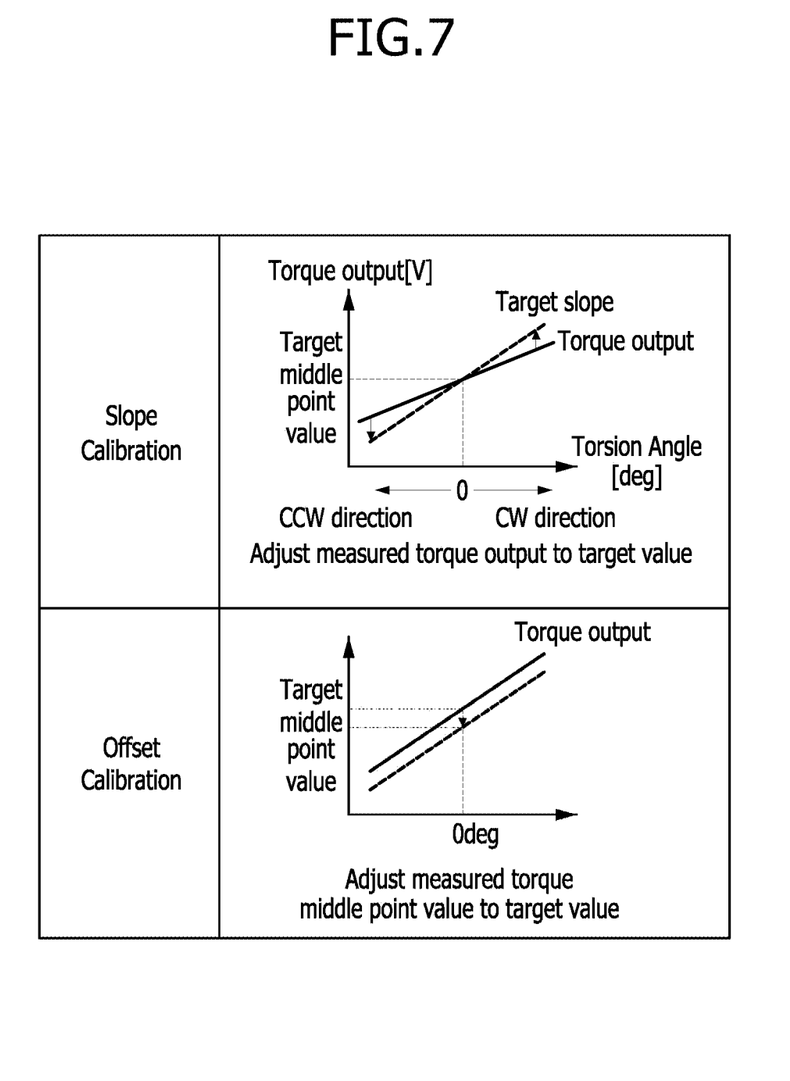
FIG. 7 is a diagram describing that offset calibration and slope calibration are performed through calibration for an output signal of the torque sensor in accordance with the embodiment of the present disclosure.

For reference, the calibration of the output signal of the torque sensor module in accordance with the present embodiment has the following effects. When the slopes of the reference target value and the output value of the torque sensor module are equal to each other as illustrated in FIG. 7, the performance of the torque sensor module may be simply optimized by calibrating the torque offset of the zero position (middle point) or performing offset calibration.

However, when the slopes of the reference target value and the actual output value of the torque sensor module are different from each other, the performance of the torque sensor module may be optimized by calibrating the output of the torque sensor module in response to the steering angle or performing slope calibration.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims. Furthermore, the embodiments described in this specification may be implemented with a method or process, a device, a software program, a data stream or a signal, for example. Although the embodiments have been discussed in a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A torque sensor module for a steering device, comprising:
   a stator fixed to a designated position of a steering shaft and configured to detect a steering angle;
   a rotor rotatably fixed in the stator;
   a signal transmitter configured to transmit torsion information between the stator and the rotor to a Hall effect IC sensor (Hall IC);
   a printed circuit board having the signal transmitter and the Hall IC mounted thereon; and
   an ECU (Electronic Control Unit) of an EPS (Electronic Power Steering) mounted on the printed circuit board.

2. The torque sensor module of claim 1, wherein the printed circuit board has a hole through which the steering shaft is installed, and the hole has a larger circumference than the circumference of the stator.

3. The torque sensor module of claim 1, further comprising a housing including and integrating the signal transmitter, the Hall IC and the ECU, integrated and mounted on the printed circuit board, the stator, and the rotor.

4. The torque sensor module of claim 3, wherein, when the signal transmitter mounted on the printed circuit board is integrated and included in the housing, an end of the signal transmitter is formed at a height corresponding to an upper end of the stator.

5. The torque sensor module of claim 1, wherein the printed circuit board further comprises a high current system circuit configured to input power to the ECU.

6. The torque sensor module of claim 5, wherein:
   the printed circuit board further comprises an electromagnetic field shielding unit arranged between the high current system circuit and the hole through which the steering shaft is installed; and
   the electromagnetic field shielding unit has a round shape to surround the circumference of the stator.

7. The torque sensor module of claim 6, wherein the electromagnetic field shielding unit is formed on both of top and bottom surfaces of the printed circuit board.

8. The torque sensor module of claim 6, wherein the electromagnetic field shielding unit is formed of a conductive material and directly connected to the printed circuit board or a chassis ground.

9. A torque sensor module for a steering device, comprising:
   a torque sensing unit configured to sense torsion of a steering shaft and output a signal corresponding to the sensed torsion; and
   a control unit configured to calibrate the signal sensed by the torque sensing unit and output an optimized signal corresponding to an error caused by an external magnetic field,
   wherein:
   the torque sensing unit comprises:
      a stator fixed to a designated position of a steering shaft and configured to detect a steering angle;
      a rotor rotatably fixed in the stator; and
      a signal transmitter configured to transmit torsion information between the stator and the rotor to a Hall IC; and
   in order to calibrate the signal sensed by the torque sensing unit, the control unit checks whether a torque offset occurs, when a steering wheel is at the zero position, and performs offset calibration to set the torque offset to 0 when the torque offset occurred.

10. The torque sensor module of claim 9, wherein, when the steering wheel is initially operated by a driver, the control unit compares a magnetic field intensity change rate depending on a current, which is changed according to a change in steering angle by the steering and supplied to the ECU, to a previously-stored magnetic field intensity change rate stored as a reference value for calibration, and calibrates a torque offset value in response to a difference between the magnetic field intensity change rates.

11. A torque sensor module for a steering device, comprising:
   a torque sensing unit configured to sense torsion of a steering shaft and output a signal corresponding to the sensed torsion;
   a control unit configured to calibrate the signal sensed by the torque sensing unit and output an optimized signal corresponding to an error caused by an external magnetic field; and
   a storage unit configured to measure and store a magnetic field intensity change rate which occurs depending on a rotation angle of the shaft, with separate power applied instead of power applied to an ECU integrated with the torque sensor module, such that the magnetic field intensity change rate is used as a reference value during calibration of the torque sensor module, wherein the torque sensing unit comprises:
   a stator fixed to a designated position of a steering shaft and configured to detect a steering angle;
   a rotor rotatably fixed in the stator; and
   a signal transmitter configured to transmit torsion information between the stator and the rotor to a Hall IC.

12. The torque sensor module of claim 11, wherein the magnetic field intensity change rate is converted into a corresponding voltage and then stored.

13. A torque sensor module for a steering device, comprising:
   a torque sensing unit configured to sense torsion of a steering shaft and output a signal corresponding to the sensed torsion; and
   a control unit configured to calibrate the signal sensed by the torque sensing unit and output an optimized signal corresponding to an error caused by an external magnetic field,
wherein:
the torque sensing unit comprises:
   a stator fixed to a designated position of a steering shaft and configured to detect a steering angle;
   a rotor rotatably fixed in the stator; and
   a signal transmitter configured to transmit torsion information between the stator and the rotor to a Hall IC; and
the control unit is configured to:
   check the current steering angle when the vehicle is started up;
   check whether a torque offset occurs by comparing a current torque value to a previously-stored torque reference value at the zero position, when the current steering angle corresponds to the zero position;
   optimize the performance of the torque sensor module by performing torque offset calibration when the torque offset occurred;
   check whether a magnetic field intensity change rate outputted from the torque sensor module is different from the previously-stored reference value, when the drivers performs steering with the performance of the torque sensor module optimized; and
   output a value obtained by calibrating a signal outputted from the torque sensor module as the output signal of the torque sensor module, when the magnetic field intensity change rate is different from the previously-stored reference value.

* * * * *